United States Patent [19]

Groth et al.

[11] 4,020,871

[45] May 3, 1977

[54] SINGLE LEVER MIXING VALVE

[75] Inventors: Hugh F. Groth; Carl E. Bochmann; Guilbert M. Hunt, all of Brecksville, Ohio

[73] Assignee: Crane Co., New York, N.Y.

[22] Filed: Mar. 1, 1976

[21] Appl. No.: 662,495

[52] U.S. Cl. .................. 137/636.1; 137/636.2; 251/7
[51] Int. Cl.² .................. F16K 7/06; F16K 11/18
[58] Field of Search .......... 137/607, 636–636.4; 251/4, 6–9

[56] References Cited

UNITED STATES PATENTS

| | | | |
|---|---|---|---|
| 2,092,401 | 9/1937 | Miller | 251/7 |
| 3,498,316 | 3/1970 | Pinder et al. | 251/7 X |
| 3,805,842 | 4/1974 | Thompson et al. | 251/7 X |
| 3,861,421 | 1/1975 | Thompson | 137/636.4 |

*Primary Examiner*—Martin P. Schwadron
*Assistant Examiner*—Richard Gerard

[57] ABSTRACT

A liquid mixing valve having a single handle for mixing hot and cold water which incorporates a pair of resilient, tube-like squeeze elements for water passage. A pair of cams, controlled by the handle through a linkage arrangement, restrict the cross-sectional area of the squeeze elements thereby regulating the hot and cold water flow rates.

11 Claims, 10 Drawing Figures

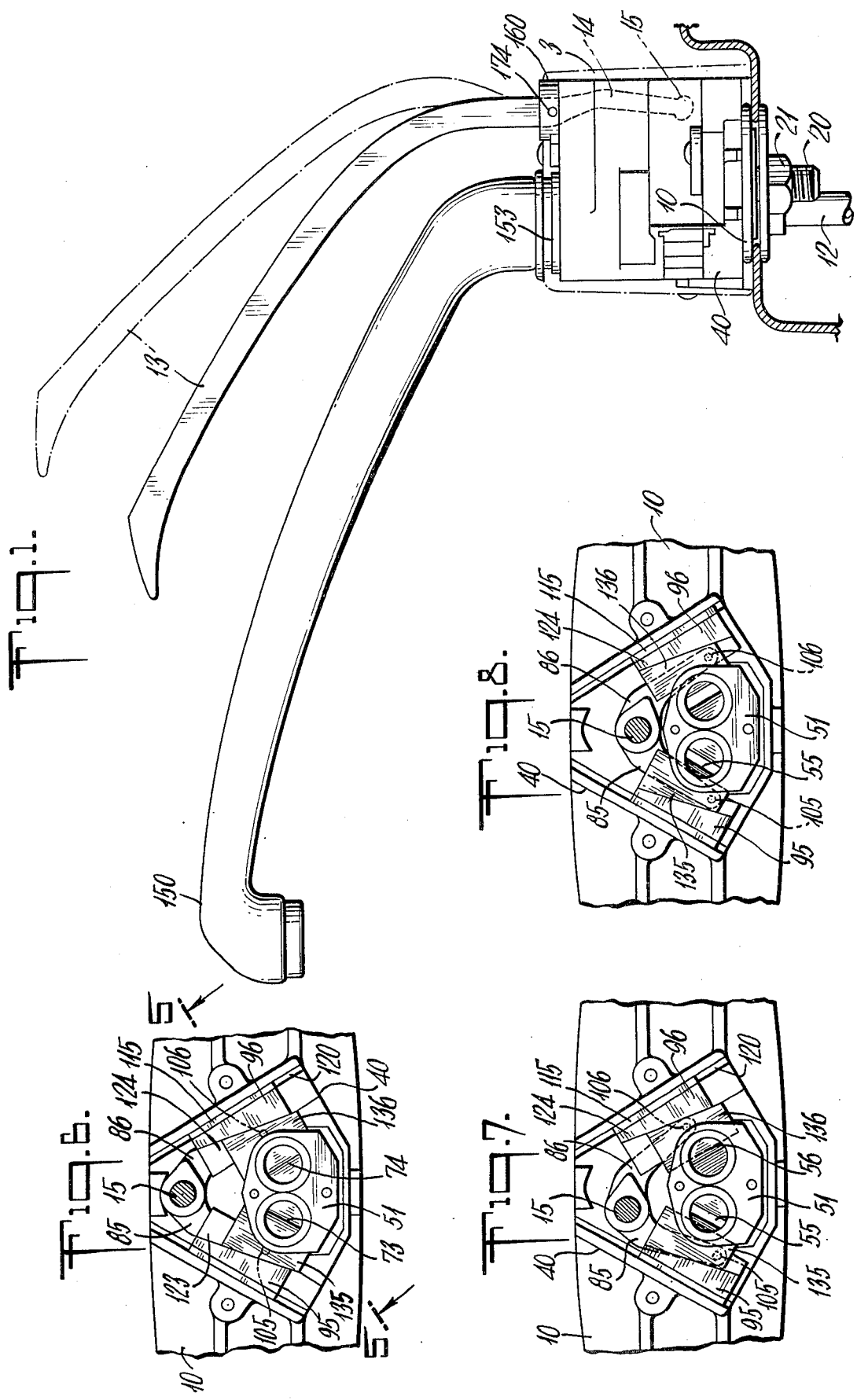

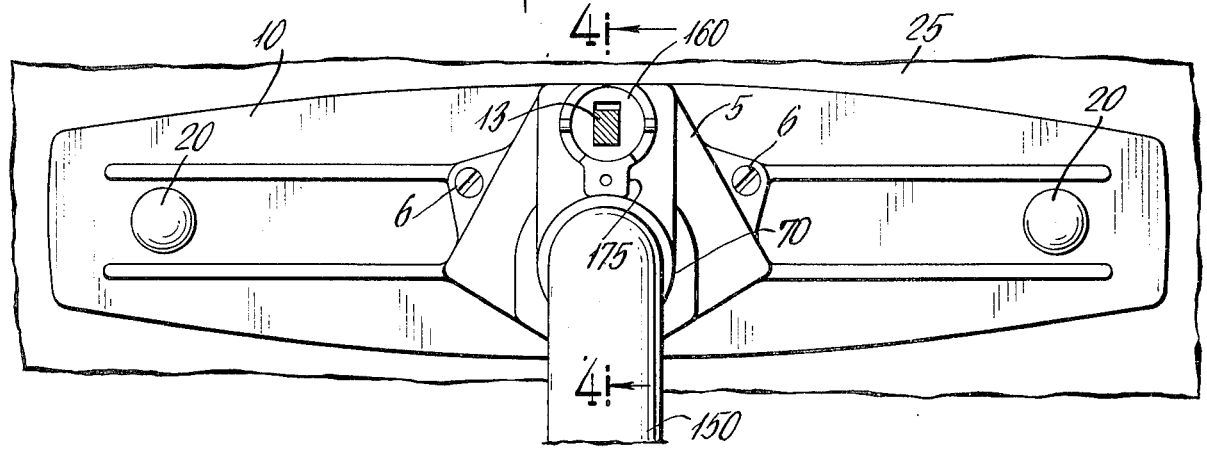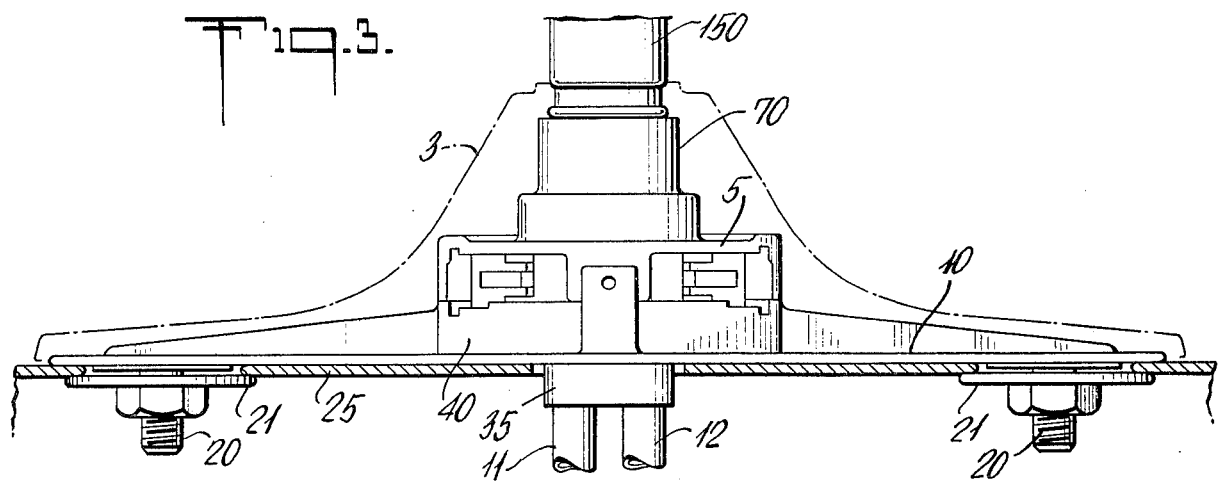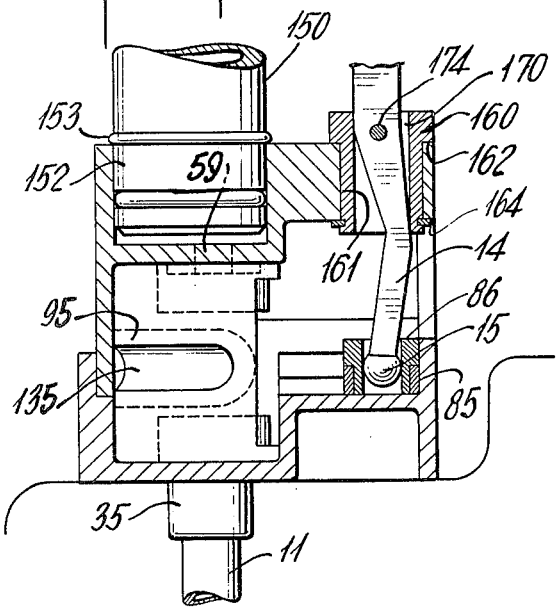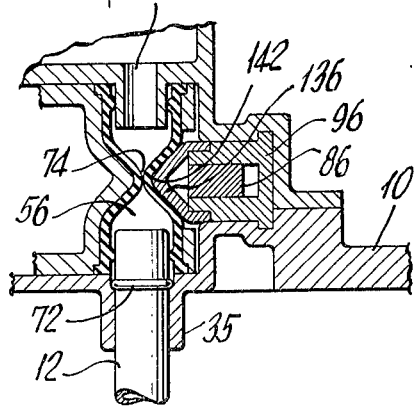

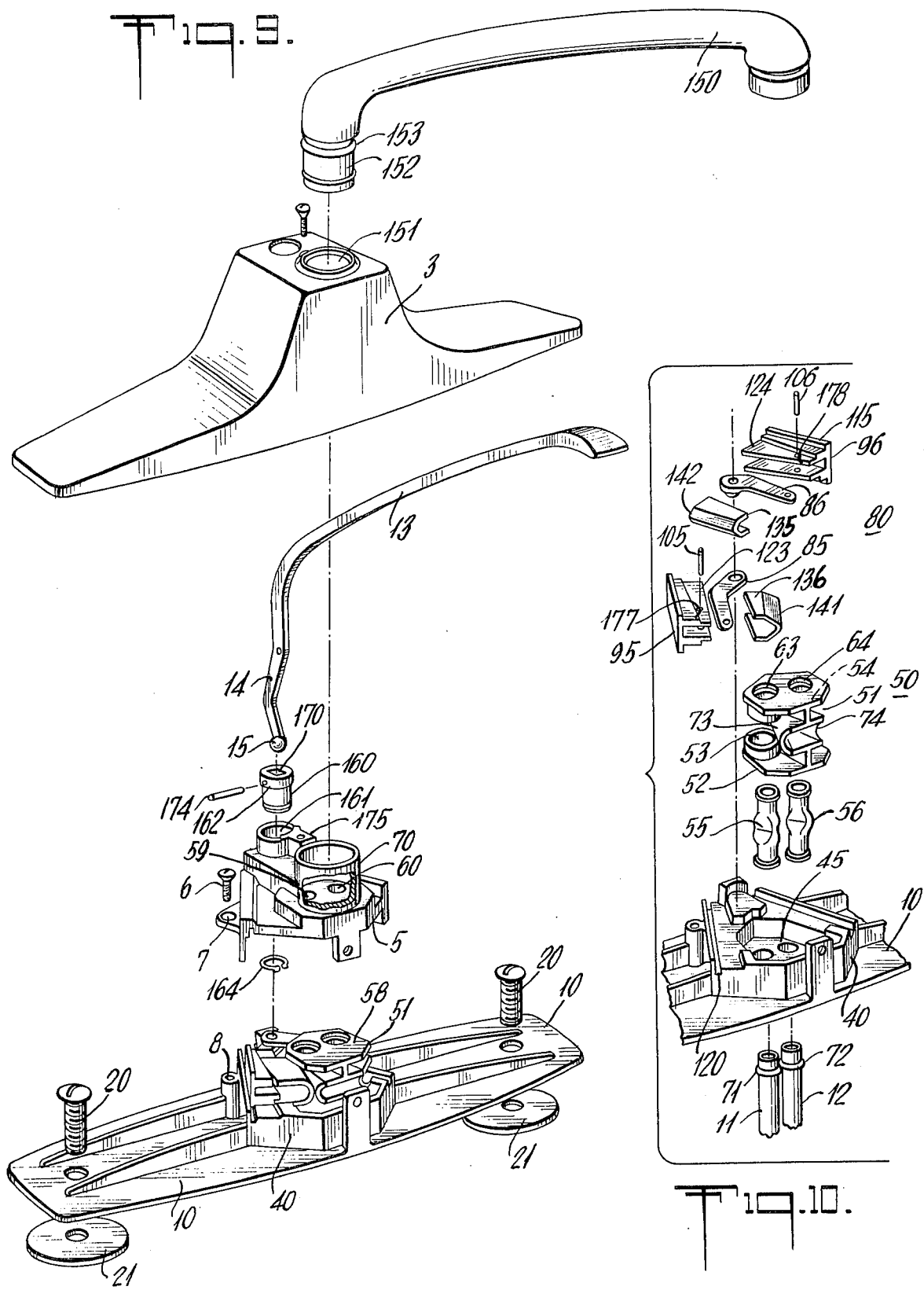

SINGLE LEVER MIXING VALVE

BACKGROUND AND SUMMARY OF THE INVENTION

This invention relates to a single handle valve for regulation of the flow rate and temperature of the water delivered. In particular, this invention relates to an improved single handle, inexpensive, reliable control valve for combined hot and cold water for kitchen sinks, bathtubs, and bathroom lavatories.

Valves incorporating a single cam operating on a pair of squeeze elements are well-known in the art. In these prior-art valves rotation of the handle exposes varying cam surfaces to the squeeze elements, while raising the handle exposes a narrower cam surface to the squeeze elements, thereby permitting the squeeze elements to expand. These valves have several undesirable features. The single cam surface must be fabricated to relatively close tolerances. The valves are susceptible to sticking or clogging with foreign matter. Sections of the valve housing and the flexible elements contacting the cam may wear excessively because of the cam travel. Replacement of worn parts is difficult, particularly for the layman.

The present invention will be seen to be an advance over the prior art in cost to manufacture, reliability, ease of repair and degree of control.

The subject design utilizes a pair of resilient, tube-like squeeze elements through which the inlet water passes. A handle, communicating with a pair of cams through a linkage arrangement, controls the degree to which the flexible elements are restricted.

BRIEF DESCRIPTION OF THE DRAWINGS

FIG. 1 is a side view of a faucet valve installation showing in solid lines the valve handle in the fully closed position and in phantom lines the valve handle in the fully open position.

FIG. 2 is a plan view of the valve.

FIG. 3 is a front elevation view of the valve with the cover plate or escutcheon shown in phantom lines.

FIG. 4 is a side sectional view of the valve assembly.

FIG. 5 is a sectional view along lines 5—5 in FIG. 6.

FIG. 6 is a plan view of the valve assembly in the closed position.

FIG. 7 is a plan view of the valve assembly showing the right squeeze element completely closed off and the left squeeze element completely open.

FIG. 8 is a plan view of the valve assembly showing both squeeze elements open.

FIG. 9 is an exploded pictorial view showing the major components of the valve assembly.

FIG. 10 is a more detailed exploded pictorial view of the individual components of the valve.

PREFERRED EMBODIMENT

With reference to the drawings and in particular FIGS. 1, 2 and 3, the valve disclosed has been primarily designed for a sink or the like. The valve mounting platform 10 is adapted to be secured as by bolt 20 and flange nut 21 to the top wall portion 25 of a sink (not shown) and in enclosing relation to the hot water inlet port 11 and the cold water inlet port 12. A valve cover plate or escutcheon 3 shown by the broken lines in FIG. 3 may be installed over the valve mounting platform and the valve components hereinafter described to provide for a more attractive unit and to protect the valve components from accidental damage and dirt. The hot water and cold water inlet ports 11, 12 respectively, are positioned by an inlet port support 35 which may be integral with the valve mounting platform 10 and the valve housing base 40. Positioning rings 71, 72, shown in FIG. 10, having outside diameters greater than the openings in inlet port support 35 are integral with hot water inlet port 11 and cold water inlet port 12, respectively to restrict the movement of the ports in the valve housing base 40 under water pressure.

Referring now to FIGS. 9 and 10, the housing base 40, has a recess 45 into which squeeze element assembly 50, comprising a squeeze element support 51 and a pair of squeeze elements 55, 56 are located. Squeeze element support 51 has a lower face 52 complementary to the recess 45 in which it is located. This lower face 52 of squeeze element support 51 has a pair of passages 53, 54 (not shown) for insertion of the hot water and cold water inlet ports 11, 12, respectively. The upper face 60 of the squeeze element support 51 also has a pair of openings 63, 64 coaxial with the lower passages 53, 54. Resilient, tube-like squeeze elements 55, 56 are located between upper face passages 63, 64 and lower face passages 53, 54, respectively, and in enclosing relationship to the hot water and cold water inlet ports 11, 12, respectively. The central section of the squeeze element support 51 is of a relatively narrow generally "V" shaped, cross-sectional area. Converging surfaces 73, 74 of squeeze element support 51 preferably are convex for co-operation with convex cam surfaces 141, 142 to restrict the flow through squeeze elements 55, 56, respectively, as hereinafter described. A linkage assembly 80, comprising a pair of links 85, 86, and a pair of sliders 95, 96 operates to transmit reciprocation and rotation of the valve handle 13 to the cams 135, 136 respectively thereby controlling the flow of water through hot water and cold water inlet ports 11, 12.

The lower section 14 of the valve handle 13, preferably having an offset bend is inserted through circular openings in the left link 85 and right link 86. The lower, substantially spheroidal terminus 15 of valve handle 13 acts as a pivot to transmit movement of the valve handle 13 to the left and right links 85, 86. These links, 85, 86 preferably are of "Dog's Leg" shape and operate in hollow channel sections of left and right of sliders 95, 96, respectively. Pivot pins 105, 106 attached through links 85, 86 to left slider 95 and right slider 96 respectively restrict the movement of the links and transmit this motion to the sliders. The motion of the sliders 95, 96 may also be constrained by extensions 115, which in the preferred embodiment, extend for the entire length of the top and bottom of each slider. These extensions fit into complementary diverging channels 120 in the housing top 5 and the valve housing base 40. Wedge-shaped recesses 123, are located on the upper and lower surfaces of slider 95, and similarly shaped recesses 124, are located on the upper and lower surfaces of slider 96, the width of the aforementioned recesses decreasing with increasing distance from spheroidal terminus 15. Surfaces 177, are perpendicular and adjacent to recesses 123, on slider 95 while surfaces 178 are perpendicular and adjacent to recesses 124 on slider 96. A pair of hollow cams, 135 and 136, having longitudinal sections shaped generally complementary to recessed surfaces 123, 124, respectively, are mounted on the aforesaid recessed surfaces as shown. This arrangement of cams 135, 136 on sliders 95, 96 respectively serves to transmit the motion of each slider to the respective cam. This arrangement also provides a unique, self-locking mechanism. Sliders 95, 96 are able to move cams 135, 136 respectively, but neither cams 135, 136 nor water pressure in squeeze elements 55, 56 can move sliders 95, 96, respectively. The curvature of cam convex sections 141, 142 should preferably be similar to, but oppositely facing to squeeze element support convex sections 73, 74, respectively. The linkage assembly 80 and the squeeze element assembly 50 should be positioned with respect to each other such that when the links 85, 86 are fully extended the cam convex sections 141, 142 and the squeeze element support convex surfaces 73, 74 cooperate to completely pinch off resilient, tube-like squeeze elements 55, 56, respectively.

Referring to FIG. 9, the housing top 5 has a shape generally complementary to housing base 40 and is designed to be attached to the housing base by screws 6 inserted through perforations 7 in the housing top into screw recesses 8 in the housing base. The upper face 58 of the squeeze element support 51 is located in a complementary shaped recess 9 in the housing top 5. A pair of passages 59, 60 through the housing top are coaxial with the squeeze elements 55, 56 and the passages 63, 64, in the upper face 58 of squeeze element support 51. In the preferred embodiment tubes having outer diameters slightly less than the internal diameters of resilient, tube-like squeeze elements 55, 56 extend downwardly from passages 59, 60 into the squeeze elements to form water-tight seals. The discharge means, comprising a mixing chamber 70 and a spout 150, is disposed above and in a surrounding relationship with the housing top passages 59, 60. Spout 150, which is inserted through orifice 151 in escutcheon 3, has an engaging section 152 with an outer diameter slightly smaller than the internal diameter of mixing chamber 70. O-ring 153 is inserted into a recess in the engaging section to provide water-tight seal between the mixing chamber 70 and the engaging section of the spout. A snap ring (not shown) is affixed to a recess in engaging section of spout 150 to retain the spout in position in the escutcheon 3. The mixing chamber 70 and the engaging section of the spout may be of various shapes. It is, however, advantageous for both to have circular cross-sectional areas so that the engaging section will be able to swivel in the mixing chamber. A pivot bearing 160 is located in passage 161 in the housing top 5. The pivot bearing has a shoulder 162 which engages housing top 5. Snap ring 164 is inserted into a recess in the bearing to prevent vertical movement of the bearing. The lower section 14 of valve handle 13 is inserted through a slot-like passage 170 in the bearing thereby enabling the terminus 15 of the valve handle to engage the circular openings in links 85, 86. The lateral opening of slot 170 should be slightly larger than the thickness of the lower section 14 of the valve handle. The transverse opening of the slot should be substantially larger than the valve handle width to permit limited reciprocation of the handle, the amount of reciprocation being determined by the maximum permissible travel of links 85, 86. A pin 174 extends through the pivot bearing 160 and the valve handle base 14 affixing the handle to the pivot bearing. A raised surface 175 on the housing top adjacent to passage 161 engages the ends of pivot bearing pin 174 and serves as a stop to restrict the degree of rotation of valve handle 13. The configuration of surface 175 on the housing top 5, thus, is determined by the maximum permissible handle rotation. The valve handle 13 thus is movable in an arcuate locus, the exact location of the handle determining the total flow rate and temperature of the water delivered. The manner in which the valve operates to regulate the amounts of hot and cold water will now be described.

With reference to FIGS. 1, 4, 5 and 6, FIG. 1 shows in solid lines the position of the valve handle 13 when the valve is fully closed to flow. FIGS. 4, 5 and 6 show the cams 135, 136 forced against the resilient tube-like squeeze elements 55, 56, respectively. The convex surfaces 141, 142 of cams 135, 136 co-operate with the convex areas 73, 74 of the squeeze element support 51 to completely close off squeeze elements 55, 56, respectively. As the valve handle 13 is raised, the pin 174 in pivot bearing 160 acts as a fulcrum causing the spheroidal terminus 15 to move away from the pivot bearing. If the valve handle 13 is in a neutral position (equidistant between right and left stop positions) the forward motion of the spheroidal terminus 15 is transmitted equally to links 85, 86. This movement of the links is transmitted by pins 105, 106 to sliders 95, 96 respectively. The extensions 115 guide the sliders along the diverging channels 120 in the valve housing top 5 and in the housing base 40. As the sliders 95, 96 move in this diverging manner, the resilient, tube-like squeeze elements 55, 56 force the cams 135, 136 outwardly against surfaces 177, 178, which are perpendicular to recesses 123, 124, respectively, in sliders 95, 96. This expansion of the squeeze elements permits water flow through the valve. The flow rate through the squeeze elements 55, 56 is controlled by the amount which the squeeze elements are allowed to expand.

Referring now to FIG. 8, if the valve handle 13 is fully raised for maximum water flow the links 85, 86 will be fully extended causing pins 105, 106 to move sliders 95, 96 the maximum predetermined distance along channels 120, thereby permitting the squeeze elements 55, 56 to expand to the maximum permissible extent. As the valve handle 13 is rotated clockwise from this neutral position with the handle 13 partially or fully raised, the lower section 14 of the valve handle which has an offset bend also rotates clockwise thereby forcing the left link 85 to become more fully extended. This movement of the left link 85 is transmitted via pin 105 to the left slider 95 which is forced to move along channels 120, in the housing base 40 and retaining top 5. As the slider 95 moves in this direction, water pressure continues to expand the resilient tube-like squeeze element 55 forcing cam 135 outwardly against perpendicular surfaces 177. Simultaneously with the aforementioned movement of the left portion of the valve, the offset bend on the lower section 14 of the valve handle 13 causes the right portion to move in a similar but substantially opposite direction. As the right link 86 is retracted, the recessed surfaces 124, of slider 96 contacting right cam 136 force the cam toward the squeeze element support convex surface 74 further restricting flow through the right squeeze element 56. Referring to FIG. 7, if this rotation of the handle is continued until pivot bearing pin 174 contacts raised surface 175 shown in FIG. 9, the right cam 136 will be forced against squeeze element 56 completely shutting off flow through this squeeze element. Thus, when the valve handle 13 has been fully rotated clockwise hot water will flow from hot water inlet port 11 through squeeze element 55, mixing chamber 70 and spout 150 while no flow will occur through the cold water inlet port 12 and squeeze element 56. Referring now to FIG.

8 as the valve handle 13 is rotated counterclockwise from the previous position toward the neutral position, the following changes occur within the valve. The spheroidal terminus 15 of valve handle 13 moves from the left section of the valve housing base 40 toward the right section. This movement of the valve handle spheroidal terminals retract the left link 85 and forces the right link 86 to become more fully extended. The left slider 95 communicating with the left link 85 through pin 105 is also retracted. This movement of slider 95, forces the left cam 135 toward squeeze element support convex surface 73, thereby constricting squeeze element 55. Simultaneously, the right section of the valve moves in the opposite direction. The extension of the right link forces pin 106 to move in a similar direction. The pin, communicating with both the right link 86 and the right slider 96, forces the right slider to move in the same direction, thereby permitting water pressure in the right squeeze element 56 to expand the squeeze element until cam 136 contacts perpendicular surfaces 178, on the right slider 96. If the rotation of the handle is continued until the pivot bearing pin 174 contacts raised surface 175, the left squeeze element 55 will be completely pinched off between sqeeze element convex cam surface 73 and cam convex surface 141 preventing the flow of hot water from inlet port 11. Cold water will continue to flow from inlet port 12 through squeeze element 56, mixing chamber 70 and spout 150. If the handle is fully raised while pivot bearing pin 174 contacts raised surface 175, the right squeeze element will be open to the maximum permissible extent, thereby permitting the maximum flow of cold water.

The invention is not to be limited to or by details of construction of the particular embodiment thereof illustrated by the drawings, as various other forms of the device will, of course, become apparent to those skilled in the art without departing from the spirit of the invention or the scope of the claims.

We claim:

1. A mixing valve of the type having a single handle for controlling the volume and relative proportion of hot and cold water flowing through the valve including:
   a. a housing adapted to receive a squeeze element assembly and linkage assembly, said housing having a hot water inlet port, a cold water inlet port and a discharge means;
   b. a squeeze element assembly positioned in said housing between said inlet ports and discharge means, said assembly including a plurality of squeeze elements, each squeeze element individually communicating with one of said inlet water ports;
   c. a plurality of cams positioned in said housing, each cam adapted to restrict the cross sectional area of the respective squeeze element; and
   d. a linkage assembly pivotally connecting with the handle for selectively moving each cam relative to a squeeze element whereby said cams cooperate with said squeeze elements to independently regulate the flow rate of water through said hot and cold water inlet ports to said discharge means.

2. The valve of claim 1 and further including a squeeze element support having a plurality of passages therethrough for said squeeze elements, said squeeze element support having open areas whereby a section of each squeeze element is exposed to said cams, said cams cooperating with said squeeze element assembly to restrict the internal cross-sectional area of each squeeze element, thereby regulating the flow rate of water through each element.

3. The valve of claim 1 wherein said linkage assembly comprises:
   a. a plurality of sliders;
   b. a plurality of links, each link pivotally connected to its respective slider to transmit movement of each link to its respective slider whereby reciprocation of the handle determines the total amount of travel of each link and its respective slider and rotation of the handle determines the relative amount of travel of each link and its respective slider.

4. The valve of claim 3 wherein each cam is supported on a surface of one of said sliders.

5. The valve of claim 4 wherein said slider surface on which each cam is supported is a wedge-like recess, the width of the recess increasing with increasing distance from the point where the handle connects with said links.

6. The valve of claim 5 wherein said surface of each cam contacting one of said sliders is shaped substantially complementary to the recess in said slider surface.

7. The valve of claim 6 wherein said cams operating on each of said squeeze elements are in planes substantially transverse to the axis of the respective squeeze element.

8. The valve of claim 7 wherein said squeeze elements are substantially parallel.

9. The valve of claim 8 wherein said squeeze elements are of substantially tube-like configuration.

10. The valve of claim 9 wherein said housing includes a base and a housing top having channels for guiding said sliders, said housing base channels being parallel to said housing top channels.

11. A mixing valve of the type having a single handle for controlling the volume and relative proportion of hot and cold water flowing through the valve including:
    a. a housing having a hot water inlet port, a cold water inlet port, and a discharge means;
    b. a plurality of links movably located in said housing pivotally connecting with the handle whereby reciprocation of said handle selectively determines the relative movement of each of said links;
    c. a plurality of sliders movably located in said housing, each slider pivotally connected to its respective link;
    d. a squeeze element support positioned in said housing;
    e. a plurality of squeeze elements located in said squeeze element support, each element individually communicating with an inlet port and with said discharge means;
    f. a plurality of cams located on said sliders, one cam operating on each squeeze element, whereby movement of each cam regulates the cross-sectional area of the respective squeeze element, thereby controlling the flow rate of water through each of said squeeze elements.

* * * * *